United States Patent [19]

Cantrell

[11] Patent Number: 4,804,140

[45] Date of Patent: Feb. 14, 1989

[54] SOLAR POWERED VENTILATING SYSTEM FOR VEHICLES

[76] Inventor: Ricky L. Cantrell, 2807 Barrett Rd., Gainesville, Ga. 30501

[21] Appl. No.: 137,588

[22] Filed: Dec. 24, 1987

[51] Int. Cl.$^4$ ............................ F24F 7/06; F24F 13/12
[52] U.S. Cl. ........................................ 236/49; 98/218; 98/900
[58] Field of Search ............. 236/49 D; 98/900, 2.11, 98/2.01, 2.18; 62/235.1

[56] References Cited

U.S. PATENT DOCUMENTS

| | | | |
|---|---|---|---|
| 395,382 | 1/1889 | Crowell | 236/49 B |
| 2,917,795 | 12/1959 | Brown | 98/900 |
| 3,943,726 | 3/1976 | Miller | 62/235.1 |
| 4,051,769 | 10/1977 | Nickerson et al. | 98/900 |
| 4,085,667 | 4/1978 | Christianson | 98/900 |
| 4,432,273 | 2/1984 | Devitt | 98/900 |
| 4,558,634 | 12/1985 | Oshiro et al. | 98/900 |
| 4,658,597 | 4/1987 | Shum | 62/235.1 |
| 4,658,599 | 4/1987 | Kajiwara | 62/235.1 X |

FOREIGN PATENT DOCUMENTS

| | | | |
|---|---|---|---|
| 140731 | 8/1978 | Japan | 98/2.18 |
| 45047 | 4/1979 | Japan | 98/2.01 |
| 67511 | 4/1983 | Japan | 98/2.01 |
| 114108 | 7/1984 | Japan | 98/2.01 |

*Primary Examiner*—William E. Tapolcai
*Attorney, Agent, or Firm*—Jerry T. Kearns

[57] ABSTRACT

A solar ventilating system utilizes a plurality of intake and exhaust ducts having small electric fans. The ducts include vents which are provided with electrical actuators. Power for the ventilating system is derived from solar panels mounted at various locations on the vehicle. The vent actuators and the electric fans are controlled by a thermostat to regulate the temperature within a parked vehicle. The ventilating system is electrically isolated from the vehicle's battery, thus allowing the system to operate indefinitely, without draining the battery.

1 Claim, 3 Drawing Sheets

SOLAR POWERED VENTILATING SYSTEM FOR VEHICLES

BACKGROUND OF THE INVENTION

1. Field of the Invention

The present invention relates to ventilating systems, and more particularly pertains to a new and improved solar powered, thermostatically controlled ventilating system for motor vehicles. When vehicles are parked outdoors in the sun, the temperature within the interior of the vehicle may rise to temperatures above one hundred degrees. These temperature levels deteriorate the various materials utilized in the construction of the interior components of the vehicle and also make the vehicle extremely uncomfortable to reenter. In order to overcome these problems, the present invention provides a solar powered ventilating system which is thermostatically controlled to regulate the temperature within a parked vehicle, without draining the vehicle's battery.

2. Description of the Prior Art

Various types of solar powered ventilating systems are known in the prior art. A typical example of such a solar powered ventilating system is to be found in U.S. Pat. No. 2,917,795, Which issued to L. Brown on Dec. 22, 1959. This patent discloses a solar operated louver system designed for covering the windows in office and industrial buildings. The louvers are formed from a plurality of metallic slats which are pivotally mounted for movement between open and closed positions. U.S. Pat. No. 4,051,769, which issued to M. Nickerson et al on Oct. 4, 1977, discloses a solar actuated vent for venting moisture from the interior of an enclosed space to atmosphere while restricting the flow of moisture back into the enclosed space. A chamber is provided in fluid communication with the enclosed space. A pressure sensitive valve is effective to vent moisture, liquid or other fluids from the chamber to atmosphere and to block flow between the chamber and the enclosed space during the period when the chamber is exposed to sunlight. U.S. Pat. No. 4,085,667, which issued to N. Christianson on Apr. 25, 1978, discloses a solar powered attic exhaust system having a solar energy transfer section supported on a roof with a spacer between the energy transfer section and the roof. Air from the attic passes through the energy transfer section through two flow channels. A turbine is provided in one of the flow channels which drives a compressor which supplies compressed air to the other flow channel. A plurality of energy absorbing blades are provided in the flow channel having the compressed air. U.S. Pat. No. 4,432,273, which issued to G. Devitt on Feb. 21, 1984, discloses a roof vent for flat built up roofs having a truncated pyramid shaped air stack with a protective cap and an internal fan for inducing upward flow through a check valve at the upper end of the stack. A solar panel provides power for operating the fan, a thermal switch is employed for enabling the fan above an ambient temperature of fifty degrees fahrenheit and a humidistat may be employed for disabling the fan below fifty percent relative humidity. U.S. Pat. No. 4,558,634, which issued to T. Oshiro et al on Dec. 17, 1985, discloses a ventilation system for motor vehicles which utilizes electric fans powered by solar panels for drawing ventilating air through pivotal louvers to ventilate the interior of a vehicle.

While the above mentioned devices are suited for their intended usage, none of these devices provide a solar powered ventilating system which utilizes electrically actuated slide vents in conjunction with electric fans and solar panels positioned between two pairs of front vents, two pairs of rear vents and on a roof panel of the vehicle. Inasmuch as the art is relatively crowded with respect to these various types of solar powered ventilating systems, it can be appreciated that there is a continuing need for and interest in improvements to such solar powered ventilating systems, and in this respect, the present invention addresses this need and interest.

SUMMARY OF THE INVENTION

In view of the foregoing disadvantages inherent in the known types of solar powered ventilating systems, now present in the prior art, the present invention provides an improved solar powered ventilating system for vehicles. As such, the general purpose of the present invention, which will be described subsequently in greater detail, is to provide a new and improved solar powered ventilating system for vehicles which has all the advantages of the prior art solar powered ventilating systems and none of the disadvantages.

To attain this, a representative embodiment of the concepts of the present invention is illustrated in the drawings and makes use of a solar ventilating system which utilizes a plurality of intake and exhaust ducts having small electric fans. The ducts include vents which are provided with electrical actuators. Power for the ventilating system is derived from solar panels mounted at various locations on the vehicle. The vent actuators and the electric fans are controlled by a thermostat to regulate the temperature within a parked vehicle. The ventilating system is electrically isolated from the vehicle's battery, thus allowing the system to operate indefinitely, without draining the battery.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved solar powered ventilating system for vehicles which has all the advantages of the prior art solar powered ventilating systems and none of the disadvantages.

It is another object of the present invention to provide a new and improved solar powered ventilating system for vehicles which may be easily and efficiently manufactured and marketed.

It is a further object of the present invention to provide a new and improved solar powered ventilating system for vehicles which is of a durable and reliable construction.

An even further object of the present invention is to provide a new and improved solar powered ventilating system for vehicles which is susceptible of a low cost of manufacture with regard to both materials and labor, and which accordingly is then susceptible of low prices of sale to the consuming public, thereby making such solar powered ventilating systems economically available to the buying public.

Still yet another object of the present invention is to provide a new and improved solar powered ventilating system for vehicles which provides in the apparatuses and methods of the prior art some of the advantages thereof, while simultaneously overcoming some of the disadvantages normally associated therewith.

Still another object of the present invention is to provide a new and improved solar powered ventilating system for vehicles which utilizes a plurality of air intake and exhaust vents with electric air blower fans which are powered by solar panels mounted on various exterior surfaces of the vehicle.

Yet another object of the present invention is to provide a new and improved solar powered ventilating system for vehicles which utilizes electrically actuated slide vents in conjunction with solar powered electric fans to thermostatically regulate the temperature within a parked vehicle, without draining the vehicle's battery.

Even still another object of the present invention is to provide a new and improved solar powered ventilating system for vehicles which utilizes solar panels mounted between two front air intake vents, on the roof of the vehicle and between two rear air exhaust vents.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
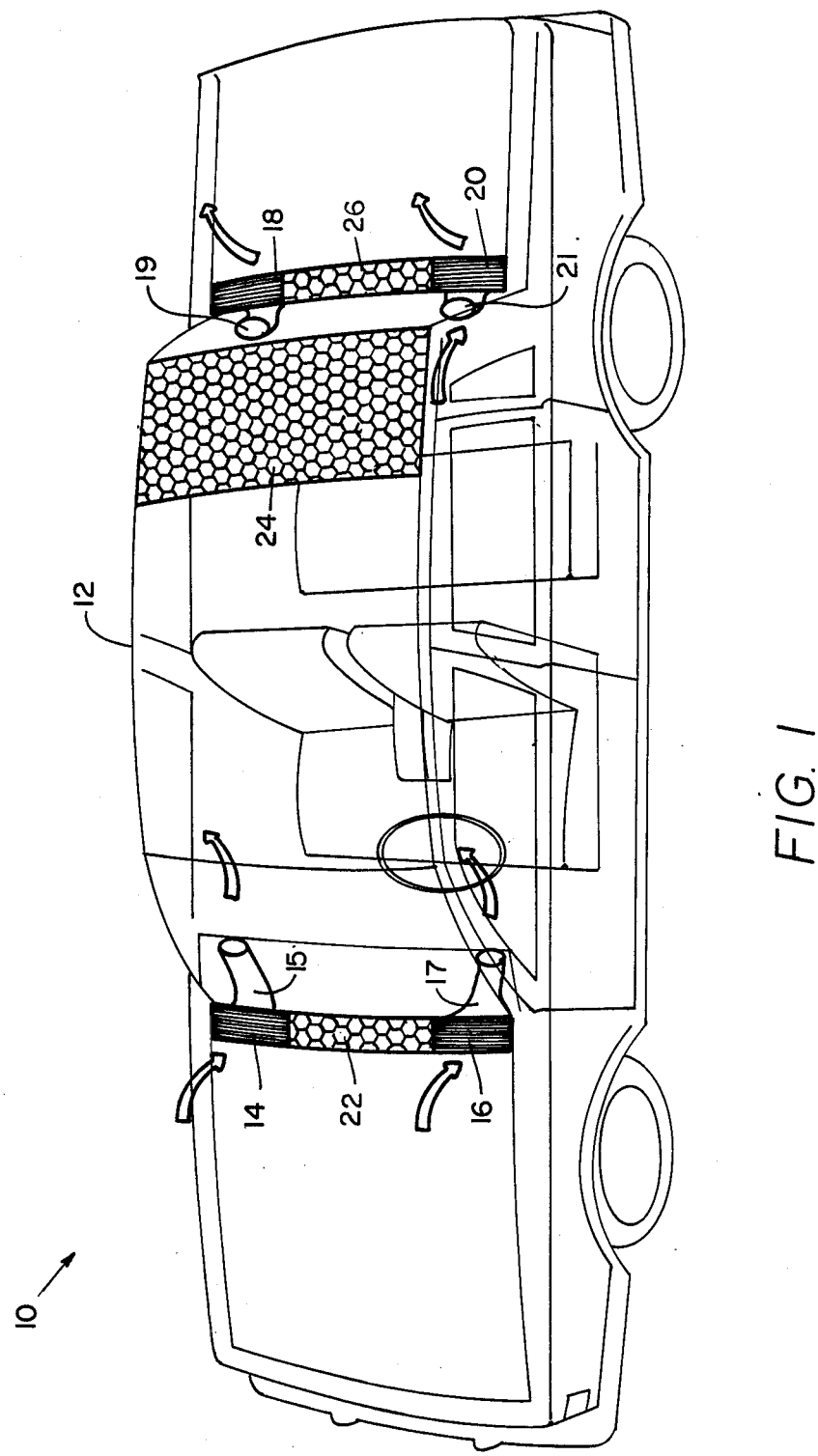
FIG. 1 is a perspective view of a vehicle incorporating the solar powered ventilating system of the present invention.

With reference now to the drawings, and in particular to FIG. 1 thereof, a new and improved solar powered ventilating system for vehicles embodying the principles and concepts of the present invention and generally designated by the reference numeral 10 will be described.

More specifically, it will be noted that the first embodiment 10 of the invention includes a vehicle 12 provided with a pair of spaced front air intake vents 14 and 16. The vents 14 and 16 communicate with air ducts 15 and 17, which conduct air to the interior of the vehicle 12. A pair of spaced air exhaust vents 18 and 20 are provided on the rear deck of the vehicle 12. The air exhaust vents 18 and 20 communicate with a pair of ducts 19 and 21 for exhausting air from the interior of the vehicle 12. A first solar panel 22 is mounted on the front deck surface of the vehicle 12, between the intake vents 14 and 16. A second solar panel 24 is mounted on the roof of the vehicle 12, and a third solar panel 26 is mounted on the rear deck surface of the vehicle 12, between the air exhaust vents 18 and 21.

Figure 2:
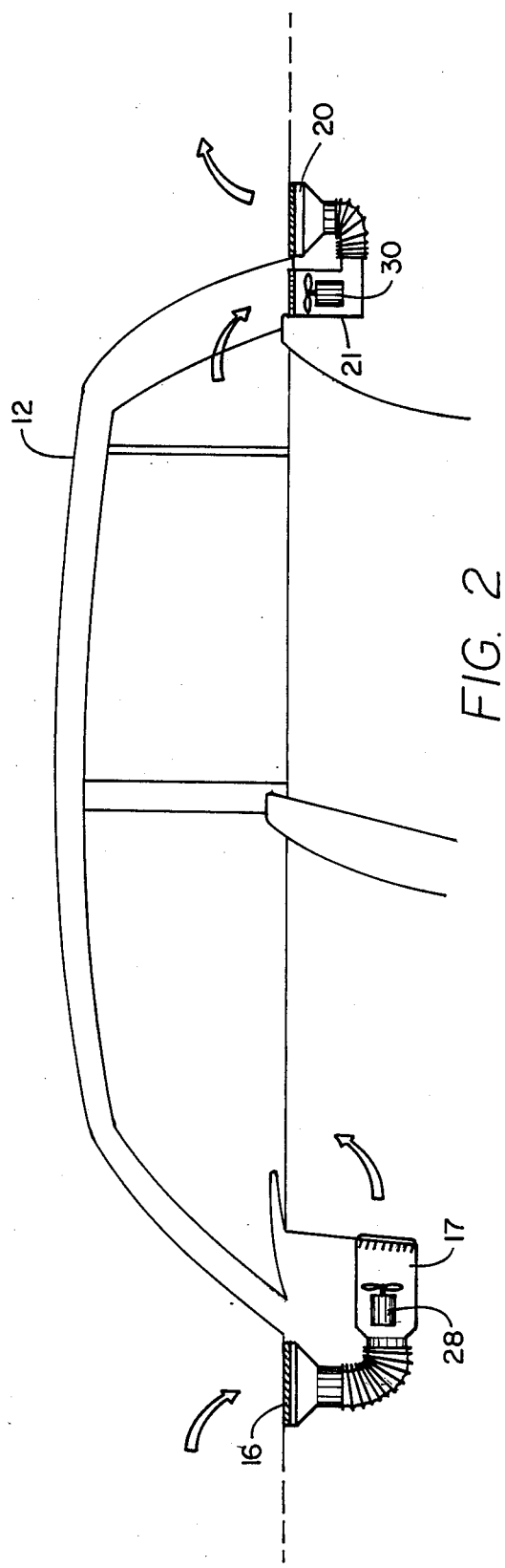
FIG. 2 is a diagrammatic side view of a vehicle embodying the solar powered ventilating system of the present invention.

In the side view of FIG. 2, it may be seen that a small electric blower fan 28 is provided in the duct 17 for drawing air through vent 16 into the interior of the vehicle 12. Similarly, a small electric blower fan 30 is provided in the duct 21, for withdrawing air from the interior of the vehicle and exhausting the air through vent 20. By this arrangement, an effective circulation of air from the front to the rear of the vehicle is provided.

Figure 3:
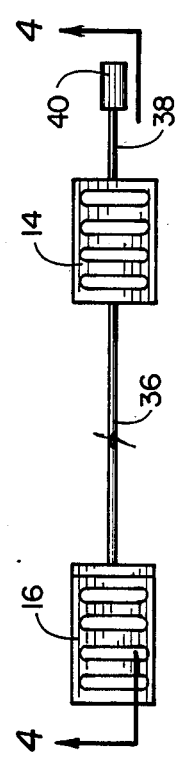
FIG. 3 is a detail view illustrating the slide vent actuator of the solar powered ventilating system of the present invention.

In FIG. 3, a detail view is provided, illustrating the vent actuator of the present invention. Each of the vents, for example, 14 and 16 are constructed from a flat metal plate provided with spaced air intake apertures.

Figure 4:
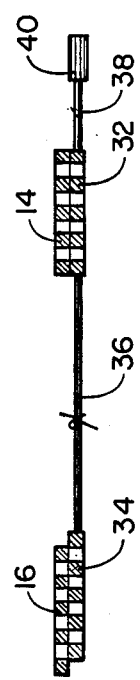
FIG. 4 is a cross sectional view of the vent actuator, taken along line 4—4 of FIG. 3.

As shown in FIG. 4, a pair of second plates 32 and 34 are slidably positioned beneath the stationary vent plates 14 and 16. The slide plates 32 and 34 are provided with cooperating apertures for selective registry with the vent apertures on the vents 14 and 16. The slide plates 32 and 34 are connected by a rod 36 and are connected to an electric solenoid type slide actuator 40 by a shaft 38. The solenoid actuator 40 serves to slide the plates 32 and 34 into and out of registry with the apertured vent plates 14 and 16. The slide plate 32 is shown in registry with the vent plate 14. Thus, the vent 14 is in an open position. The slide plate 34 is shown out of registry with the vent plate 16, thus the vent 16 is in a closed position. It should be understood, that the slide plates 32 and 34 move in unison, and thus in actuality, both vents 14 and 16 will either be in an open or closed position.

Figure 5:
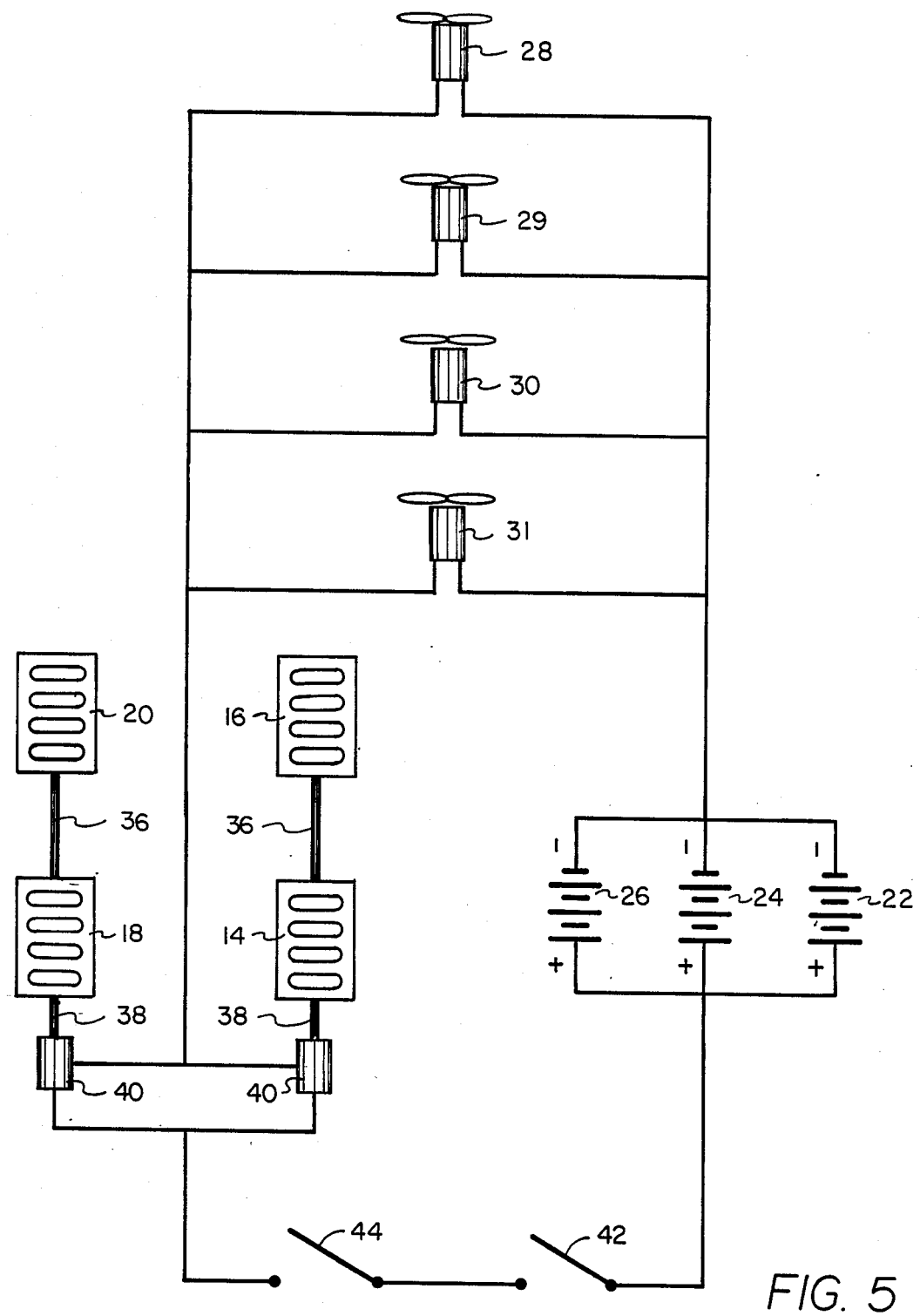
FIG. 5 is a schematic diagram illustrating the electrical connections of the solar powered ventilating system of the present invention.

With reference now to FIG. 5, a schematic diagram illustrating the connection of the various electrical components of the solar powered ventilating system of the present invention is provided. Solar panels 22, 24, and 26 are connected in parallel to provide electrical power to the circuit. A first switch 42 is connected to the ignition switch of the vehicle, and will be turned on when the vehicle ignition switch is turned off. A second switch 44, in series with the switch 42 is thermostatically controlled by a conventional thermostatic device. This thermostatic device may be of the type which utilizes a bimetallic strip to actuate the switch 44. A pair of solenoid actuators 40 are connected in parallel for opening and closing the front vents 14 and 16 and the rear vents 18 and 20. Due to the parallel connection of the actuators 40, the front and rear vents will be simultaneously actuated. Four electric blower fans 28, 29, 30 and 31 are connected in parallel for circulating air through the interior of the vehicle 12. Air intake blower fans 28 and 29 are disposed within the ducts 15 and 17 adjacent the front of the vehicle 12 and air exhaust blowers 30 and 31 are received in the ducts 19 and 21 adjacent the rear of the vehicle. In operation, when a vehicle owner parks the vehicle 12 and turns off the ignition switch, the switch 42 will be moved to a closed position. When the temperature within the vehicle 12 rises above a predetermined temperature, the thermostatic switch 44 will be closed, thus providing electric current from the solar panels 22, 24 and 26 to the vent actuators 40. The front air intake vents 14 and 16 and the rear air exhaust vents 18 and 20 will thus be simultaneously opened. Concurrently with the opening of the vents, the air intake fans 28 and 29 will be turned on as well as the air exhaust fans 30 and 31. The system will continue in operation until the temperature is lowered beneath the predetermined level, thus opening the thermostatic switch 44. Because the solar panels 22, 24 and 26 are utilized to provide electric power, the ventilating system of the present invention does not drain the vehicle's battery, and thus the system may continue to operate indefinitely, as long as sufficient sunlight is available. Because the presence of sunlight is required to elevate the temperature within the vehicle, it may be seen that a sufficient supply of electric power will always be available when the temperature within the vehicle is above the predetermined level. When either of the switches 42 or 44 is opened, a spring within the solenoids 40 will close each of the vents 14, 16, 18 and 20. Thus, closing of the vents requires no additional electrical power and the vents will automatically be closed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar powered ventilating system for a vehicle, comprising:

a pair of spaced air intake vents disposed adjacent a front portion of said vehicle;

a pair of spaced air exhaust vents disposed adjacent a rear portion of said vehicle;

each of said vents formed as a thin plate provided with a series of spaced apertures;

a pair of connected slide plates slidably disposed beneath said air intake and said air exhaust vents, each pair of said slide plates having a series of spaced apertures for registry with said vent plate apertures;

a rod connecting each pair of said slide plates together and to an electrical solenoid actuator for moving said slide plates into and out of registry with said vent plates;

an air duct communicating with each of said vents;

an electrical air blower fan received in each of said air ducts;

a first solar panel on an exterior surface of said vehicle, between said air intake vents;

a second solar panel on an exterior surface of said vehicle, between said air exhaust vents;

a third solar panel on an exterior roof surface of said vehicle;

a first switch connected to be closed when an ignition switch of said vehicle is turned off;

a thermostatic switch which is closed when the temperature in the interior of said vehicle rises above a predetermined level;

said air blower fans, said solar panels, and said solenoid actuators connected in parallel; and said first switch and said thermostatic switch connected in series whereby, when said vehicle ignition switch is turned off and the temperature in said vehicle interior exceeds said predetermined level, said intake and exhaust vents will be opened, and air will be drawn through said vehicle interior by said air blower fans.

* * * * *